United States Patent
Astrom et al.

(10) Patent No.: US 9,622,107 B2
(45) Date of Patent: Apr. 11, 2017

(54) HANDLING DATA IN A COMMUNICATIONS NETWORK

(71) Applicant: Telefonaktiebolaget L M Ericsson (publ), Stockholm (SE)

(72) Inventors: Bo Astrom, Stockholm (SE); Tomas Nylander, Värmdö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/430,358

(22) PCT Filed: Oct. 25, 2012

(86) PCT No.: PCT/EP2012/071120
§ 371 (c)(1),
(2) Date: Mar. 23, 2015

(87) PCT Pub. No.: WO2014/063734
PCT Pub. Date: May 1, 2014

(65) Prior Publication Data
US 2015/0257032 A1    Sep. 10, 2015

(51) Int. Cl.
*H04W 28/02* (2009.01)
*H04L 12/725* (2013.01)
(Continued)

(52) U.S. Cl.
CPC ......... *H04W 28/0247* (2013.01); *H04L 45/30* (2013.01); *H04L 45/306* (2013.01); *H04L 45/745* (2013.01); *H04L 67/327* (2013.01)

(58) Field of Classification Search
CPC ........... H04W 28/0247; H04Q 11/0478; H04L 45/30; H04L 45/306; H04L 45/745;
(Continued)

(56) References Cited

U.S. PATENT DOCUMENTS

2008/0291923 A1    11/2008  Back et al.
2010/0054157 A1*   3/2010   Farkas .................. H04L 12/462
                                                     370/256
(Continued)

FOREIGN PATENT DOCUMENTS

WO    2010/023646 A2    3/2010
WO    2010127524 A1     11/2010

OTHER PUBLICATIONS

International Search Report issued in corresponding International application No. PCT/EP2012/071120, date of mailing of report Jun. 20, 2013.

(Continued)

*Primary Examiner* — Afsar M Qureshi
(74) *Attorney, Agent, or Firm* — Patent Portfolio Builders, PLLC

(57) ABSTRACT

A method and apparatus for handling data between a radio network and a service network, the data comprising Network Aware data. A gateway node in a mobile core network receives a message from the radio network. It then determines whether the message comprises Network Aware data. If it does, then the message is routed to a Packet Data Network Gateway node configured to handle Network Aware data. If it doesn't, then the message is routed to a Packet Data Network Gateway node for message handling. This ensures that non-Network Aware data is handled using regular message handling, and Network Aware data is handled by nodes configured to handle Network Aware data.

16 Claims, 14 Drawing Sheets

(51) Int. Cl.
*H04L 29/08* (2006.01)
*H04L 12/741* (2013.01)

(58) Field of Classification Search
CPC .............. H04L 67/327; H04L 67/1095; H04L 67/1097; H04L 41/0896; H04L 41/5019; H04L 41/00
USPC ......................................................... 370/236
See application file for complete search history.

(56) References Cited

U.S. PATENT DOCUMENTS

| | | | |
|---|---|---|---|
| 2010/0202508 A1* | 8/2010 | Karaoguz | H04N 21/2381 375/240.01 |
| 2011/0080886 A1 | 4/2011 | Chandrachood et al. | |
| 2013/0262681 A1* | 10/2013 | Guo | G06F 9/5027 709/226 |
| 2014/0098687 A1* | 4/2014 | Anthony, Jr. | H04W 36/0033 370/252 |

OTHER PUBLICATIONS

Written Opinion of the International Searching Authority issued in corresponding International application No. PCT/EP2012/071120, date of mailing Jun. 20, 2013.

Atis, "Network Optimization Focus Group (NetOp-FG) Assessment and Recommendations," 3rd Generation Partnership Project (3GPP), Mobile Competence Centre, 650, Route des Lucioles; F-06921 Sophia-Antipolis Cedex, France, Nov. 8, 2011, XP050574392.

3GPP, "3rd Generation Partnership Project, Technical Specification Group Services and System Aspects; Policy and Charging Control Architecture (Release 11)," 3GPP Standard, 3GPP TS 23.203, Mobile Competence Centre, 650, Route des Lucioles; F-06921 Sophia-Antipolis Cedex, France, vol. SA WG2, No. V11.7.0, Sep. 11, 2012, pp. 1-178, XP050649048.

Kutscher, D. et al., "Mobile Communication Congestion Exposure Scenario," draft-kutscher-conex-mobile-03.txt, Internet Engineering Task Force, IETF; Standard Working Draft, Internet Society (ISOC), 4, rue des Falaises, Geneva, Switzerland, CH-1205, Mar. 12, 2012, pp. 1-22, XP015081906.

Panasonic, "Alternative Solution for Service Based Traffic Steering," 3GPP Draft; S2-102334 Traffic Steering Vo-1-1, 3rd Generation Partnership Project (3GPP) Mobile Competence Centre, 650, Route des Lucioles; F-06921 Sophia-Antipolis Cedex, France, vol. SA WG2 Meeting #79, No. Kyoto, Japan, May 10-14, 2010, XP050434513.

* cited by examiner

HANDLING DATA IN A COMMUNICATIONS NETWORK

TECHNICAL FIELD

The present invention relates to the field of handling data in a communications network.

BACKGROUND

A mobile network is typically divided into different domains as illustrated below in simplified FIG. 1 showing an exemplary communications network. The exemplary communications network includes a radio network 1, a mobile core network 2 and a service network 3 that includes various nodes and applications. Note that the terms radio network and radio access network (RAN) refer to the same network in this description.

The radio network 1 includes ways for a user device to access the communications network, and can include any of a NodeB 4 that attached to a Radio Network Controller (RNC) 5, an eNodeB (evolved Node B) 6, and a WiFi Access Point (AP) 7 that attaches to a WiFi Access Controller 8.

The mobile core network 2 includes mobile core nodes that link the radio network 1 to the service network 3. Examples of such nodes include a Serving Gateway (SGW), Packet Data Network Gateway (PDN Gateway or PGW) and so on.

The service network 3 includes nodes such as servers that provide services to the user device. In this example, a cache server 10, a video server 11, an analytics server 12 and a further server 13 are shown but it will be appreciated that many different types and combinations of servers can be used in the service network 3.

The functionality located in the service network 3 is typically centralized to a few sites and realized without any explicit information exchange and control signalling interaction with the radio network 1. In FIG. 1, only mobile core nodes where user plane traffic is handled are shown, i.e. SGW/PDN GW (or, alternatively, GGSN, Gateway GPRS (General Packet Radio Service) Support Node, in a WCDMA (Wideband Code Division Multiple Access) network) 9. Between the radio network 1 and the SGW/PDN GW (/GGSN) 9, the GTP-U protocol (GPRS Tunnelling Protocol User Plane) is used. Between the SGW/PDN GW (/GGSN) 9 and the service network 3, the Gi interface (i.e. a normal IP network) is used.

There is a current desire in the telecommunications industry to more closely link radio network and service network functionality together in order to optimize service delivery and radio resource usage. For example, data packets sent from the service network 3 could be delayed if the service network 3 it is aware that the radio network 1 is currently congested and experiencing delays. Access specific information (radio awareness) is therefore useful for the service network 3. It is also possible that the radio network 1 can make use of information relating to the service network 3.

There is also a desire to localize and distribute service network functionality further out in the radio network to save transport resources and to optimize delivery times by providing services from locations closer to the user device.

The requirement and uses for access specific information (radio awareness) in the mobile core network 2 and service network 3 are constantly increasing due to new emerging use cases such as optimized cache play-out, context based service tailoring (e.g. location, radio access technology used), and user and network analytics. Furthermore, the radio network can use information about the services in order to optimize the delivery and resource usage in the radio. These use cases and functions therefore require some sort of information exchange and control signalling interaction between the service network 3 and the radio network 1 (e.g. RNC 5, eNB 6, WiFi access controller 8). Functions operating on the user plane also require access to the user plane flow.

The option to extract application specific information from data packet flows by means of packet inspection, and to apply subscriber specific policies, is specified in 3GPP Release 6. It is termed Flow Based Charging (FBC), and later evolved into the 3GPP Policy and Charging Control (PCC) architecture. The initial driver for PCC was to enable differentiated charging, QoS treatment of packet flows and mapping of services to bearers with different QoS. However to optimize the use cases/features discussed above, additional information exchange and explicit control signalling is required between the domains 1, 2, 3.

A problem with existing communications networks is that some data is not available to all functional entities that could potentially use it to optimize service behaviour, radio resource usage and so on.

SUMMARY

It is an object of the invention to provide a mechanism by which Network Aware data can be provided to all nodes in a communications network that require such data. According to a first aspect, there is provided a method of handling data between a radio network and a service network, the data comprising Network Aware data. A gateway node in a mobile core network receives a message from the radio network. It then determines whether the message comprises Network Aware data. If it does, then the message is routed to a Packet Data Network Gateway node configured to handle Network Aware data. If it doesn't, then the message is routed to a Packet Data Network Gateway node for message handling. This ensures that non-Network Aware data is handled using regular message handling, and Network Aware data is handled by nodes configured to handle Network Aware data.

As an option, the gateway node performs deep packet inspection on packets traversing the gateway node to determine whether the message comprises Network Aware data.

The gateway node optionally maps an address used in the radio network to an address usable by the service network.

The gateway node optionally maps a Protocol Data Unit used in the radio network to a Protocol Data Unit usable by the service network.

As an option, the Protocol Data Unit is received as an extension header over an established General Packet Radio Service Tunnelling Protocol User Plane connection.

The Protocol Data Unit is optionally received at the gateway node as any of a message comprising no payload, a message comprising a payload and an echo test message.

As an alternative option, the Protocol Data Unit is received at the gateway node as user plane data in a General Packet Radio Service Tunnelling Protocol User Plane message.

As a further alternative option, the Protocol Data Unit is received at the gateway node using a dedicated signalling protocol.

The Protocol Data Unit optionally includes a message type indicating that the message is destined for a plurality of nodes. As a further option, the message is addressed to a fictitious end point in the service network to ensure that it does not get forwarded to nodes that do not require the message.

According to a second aspect, there is provided a gateway node for use in a mobile core network. The gateway node is provided with a receiver for receiving a message from a radio network. A processor is provided for determining whether the message comprises Network Aware data. A first transmitter is provided for, in the event that the message comprises Network Aware data, sending the message to a Packet Data Network Gateway node configured to handle Network Aware data. A second transmitter is provided for, in the event that the message does not comprise Network Aware data, routing the message to a Packet Data Network Gateway node for message handling.

As an option, the processor is arranged to perform deep packet inspection on packets traversing the gateway node to determine whether the message comprises Network Aware data.

The processor is optionally further arranged to map an address for the message used in the radio network to an address usable by the service network.

As an option, the processor is arranged to map a Protocol Data Unit used in the radio network to a Protocol Data Unit usable by the service network.

The processor is optionally arranged to address the message to a fictitious end point in the service network.

According to a third aspect, there is provided a method of bootstrapping between a radio network, a mobile core network and a service network. The method comprises, at a gateway node in the mobile core network, receiving from a node in the radio network a bootstrap request message, the bootstrap request message indicating that the node in the radio network is capable of handling Network Aware data. The gateway node sends a response message to the node in the radio network, the response message indicating that the gateway node is capable of handling Network Aware data.

As an option, the gateway node sends to a Policy Charging and Rules Function in the service network, a message identifying the gateway node in the event that the Policy Charging and Rules Function handles Network Aware data.

According to a fourth aspect, there is provided a computer program comprising computer readable code means which, when run from a computer readable medium in the form of a memory in a processor in a gateway node, causes the gateway node to perform a method as described above in either of the first or third aspects.

According to a fifth aspect, there is provided a computer program product comprising a computer readable medium and a computer program as described above in the fourth aspect, wherein the computer program is stored on the computer readable medium.

DETAILED DESCRIPTION

Figure 1:
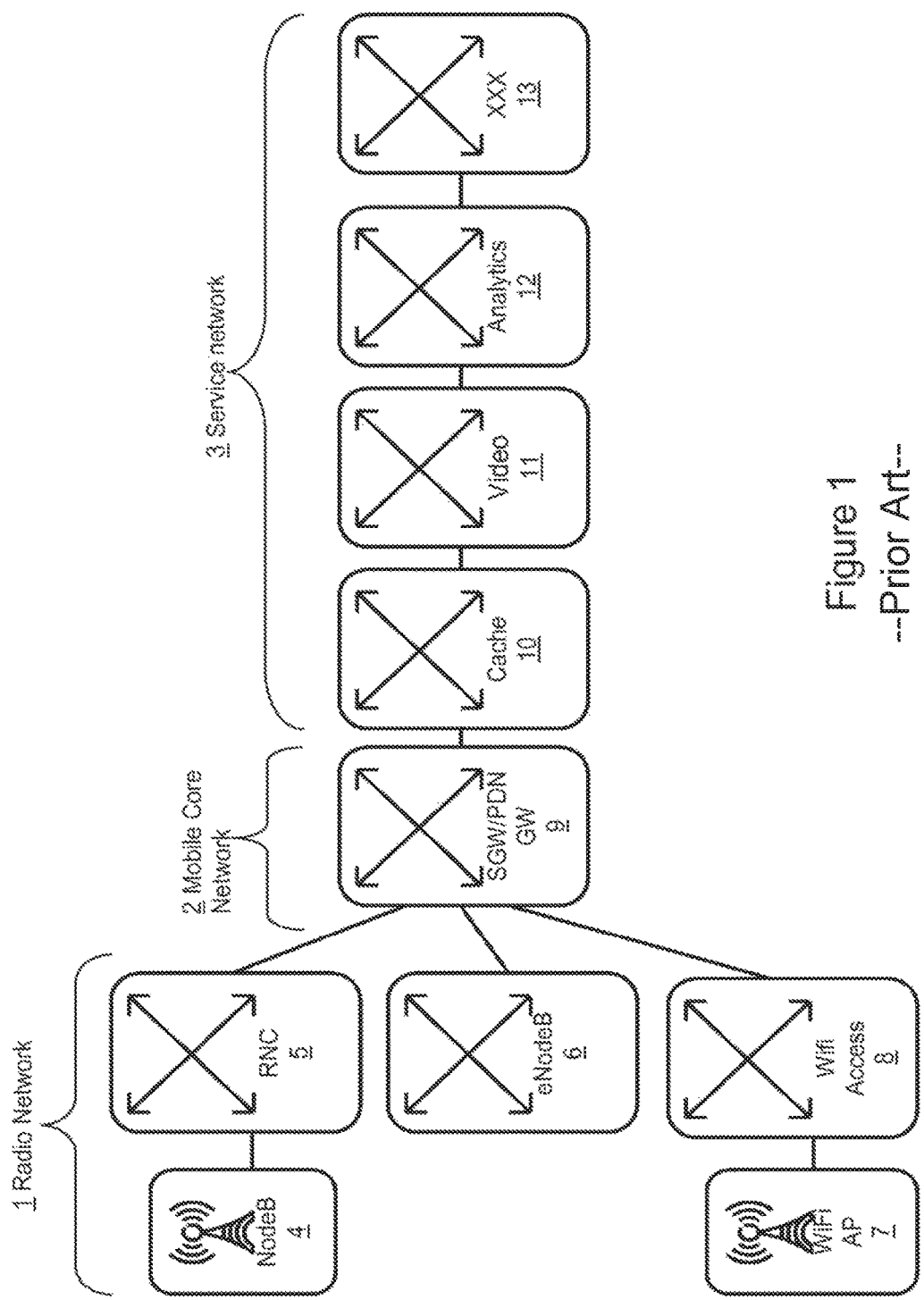
FIG. 1 illustrates schematically in a block diagram an exemplary communications network.

There are described below techniques by which information currently not available to various nodes in one domain relating to conditions in another domain, can be delivered between Network Aware applications in the service network 3 and the radio network 1. The signalling procedures used to deliver this data are referred to herein as SMPF (Smart Mobile Broadband Protocol Framework).

The terms Network Aware applications and Network Aware data used herein refer to applications and data where nodes in the radio network 1 require information about the nodes in the service network 3, or nodes in the service network 3 require information about nodes in the radio network 1. For example, in regular video delivery, a streaming video server simply sends the video data towards the radio network 1 regardless of the current conditions or allocation of radio resources in the radio network 1. However, it is preferable for nodes in the radio network 1 to allocate resources and send the data in one burst when radio conditions are good. Similarly, if a large data file is to be delivered to a user, this may not be time critical. As loads fluctuate in the radio network 1, it would be better to send this at a time of low load. By nodes in each domain 1, 3 informing each other of local conditions or requirements, better resource planning can be implemented. Network Aware applications are therefore applications that include information about local conditions and requirements, and allow data to be sent accordingly. Network aware data may be considered to be data sent between networks that informs a node in a destination network (e.g. the service network 3) about conditions and/or requirements in the requesting network (e.g. the radio network 1). The node would otherwise handle all data requests the same, regardless of the conditions or requirements of the requesting network. For example, if the node in the destination network is a video streaming server and it receives an HTTP request for video, it currently provides the same video to the requesting network regardless of the requirements or conditions within the requesting network. If the requesting network is a radio network, then it can include network aware data such as the current conditions in the radio network. The node can therefore adjust its behaviour and, for example, provide high quality video in the event that the radio network is currently experiencing little congestion, or low quality video in the event that the radio network is currently experiencing high congestion. Similarly the radio network 1 can benefit from receiving Network Aware data regarding the service network 3. For example, if a user device moves to a specific location, this can trigger the radio network 1 to request a particular service.

Figure 2:
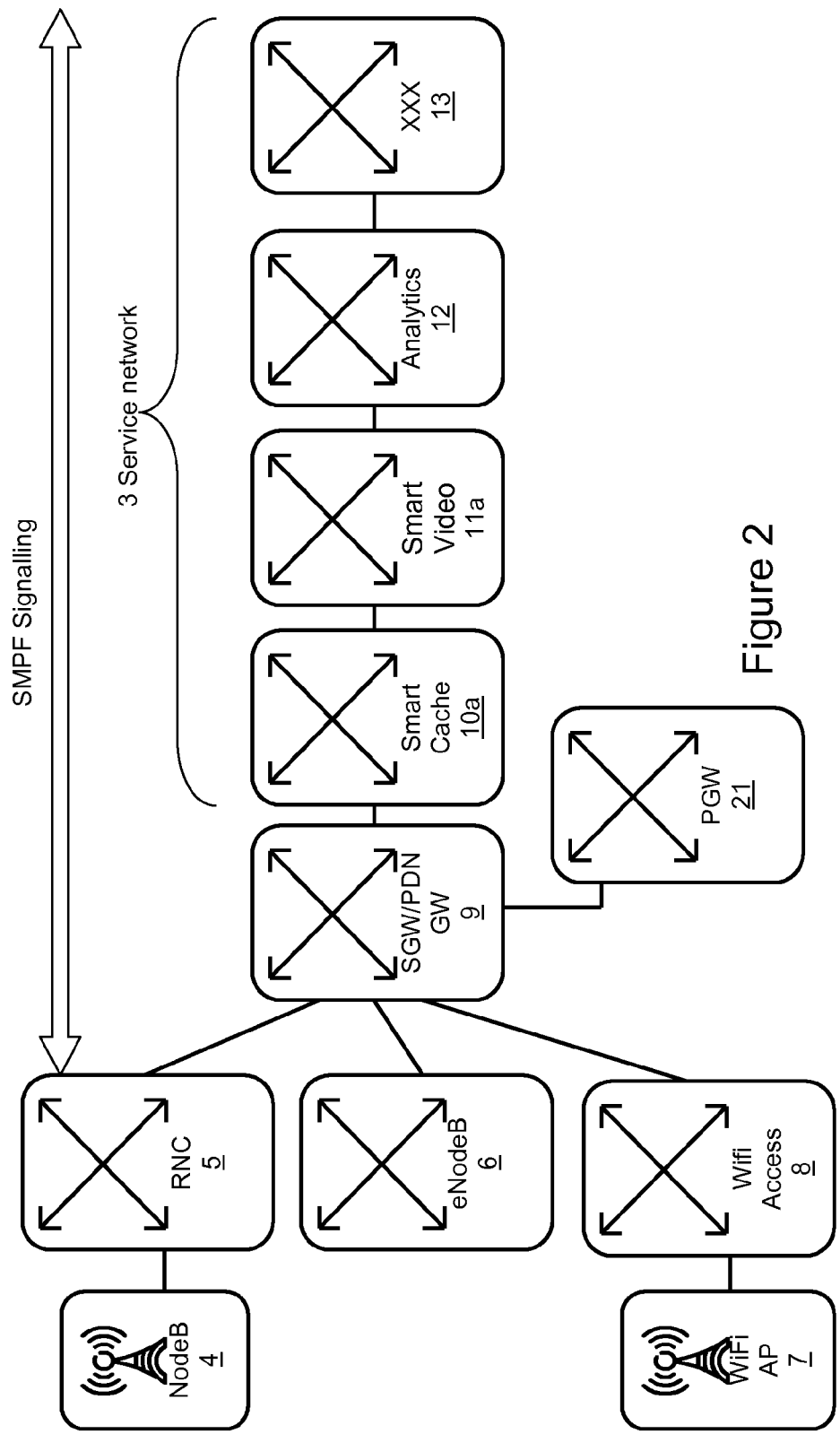
FIG. 2 illustrates schematically in a block diagram an exemplary communications network showing where SMPF signalling is required.

Referring to FIG. 2 herein, there is illustrated the exemplary network of FIG. 1 showing which nodes requires SMPF signalling. In this case, the cache 10 is replaced with a Smart cache 10a and the video server 11 is replaced with a Smart video server 11a. Both these nodes 10a, 11a can benefit from received Network Awareness data, and modify their behaviour according to received Network Awareness data. It can be seen that SMPF signalling must go between the radio network 1 and the service network 3 via the mobile core network 2.

To better understand the motivation for the techniques described below, it is helpful to describe some of the uses that can be made of the sort of Network Awareness data to be carried between the radio network 1 and the service network 3. The sort of information that can be carried using the SMPF signalling includes:

Improved end user experience leading to increased end user loyalty and reduced churn.
  Signalling of service characteristics from the service network 3 to the radio network 1 allowing the radio network 1 to reshape the traffic to improve radio usage.
  Signalling of DPI (Deep Packet Inspection) retrieved data to Network Aware applications. Instead of performing DPI at many nodes, nodes receiving SMPF signalling can leverage information from already performed DPI activities, for tailoring of services.
  Signalling of Control Plane received information enabling nodes receiving SMPF signalling to access data they normally do not receive, obtained by other SMPF-enabled nodes from control plane signalling (e.g. location, RAT, Terminal Type, etc).
Reduced battery consumption in terminals: Network Awareness in the radio network 1 enables optimizations of radio state transitions, drastically reducing the battery consumption.
Improved market segmentation and Mobile Broadband (MBB) monetization: For example, radio resource demanding services such as video can be reserved for flows for services with paying users.
Input to network and user analytics: Customer care can be provided with a deeper understanding of how a service is behaving and why a user may have suffered performance degradation at a given time, and at the same time trigger a build out of the network in that area.
The operator can use historical and current data gathered in user activity profiles to offer new appealing services.

Figure 3:
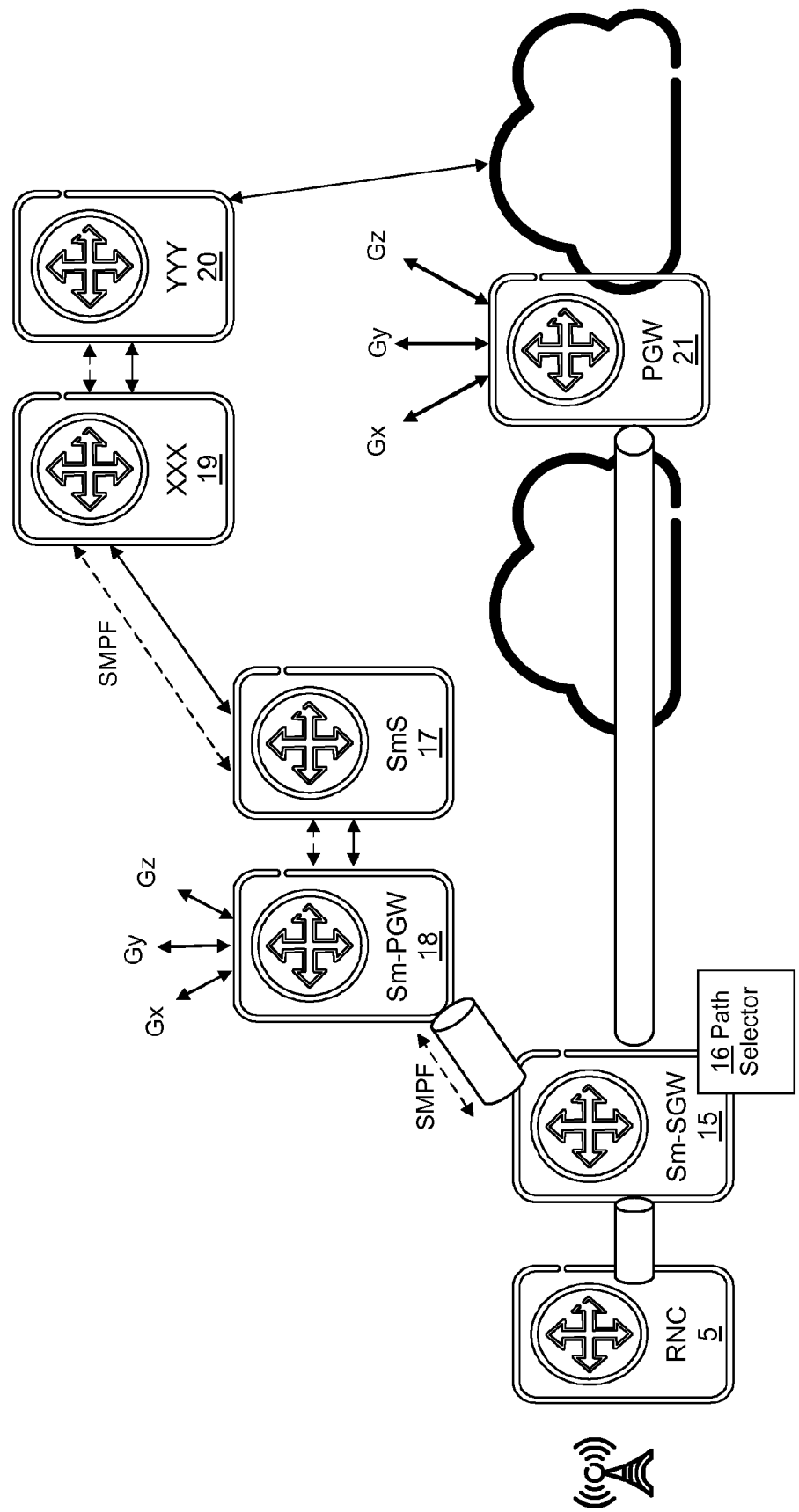
FIG. 3 illustrates schematically in a block diagram an exemplary communications network according to an embodiment of the invention.

FIG. 3 illustrates an exemplary network. A RAN entity such as an RNC node 5 (although note that this could be any suitable RAN entity, and RNC is used herein by way of example) sends signalling to the radio network 1 and a Smart SGW (Sm-SGW) 15. The Sm-SGW 15 hosts a Path Selector function 16 (described in more detail below) in the SGW. The Path Selector 16 determines which nodes have access to the SMPF generated signalling (the dashed arrows in FIG. 3). This is determined, for example, by Packet Inspection (PI) or Deep Packet Inspection (DPI) of the user plane traffic. An alternative way to determine this is to check for the presence of GTP-U extension headers in the event that they are being used.

Nodes with Network Aware Applications are consumers of SMPF information, and SMPF data traffic is routed to these nodes. In FIG. 3, an example of such a Network Aware application is denoted SmS (Smart Server) 17. The SMPF signalling is recognized by the Path Selector 16 and routed to the SmS 17 via a Smart PGW (Sm-PGW 18. The SMPF signalling may be further distributed to other applications, as illustrated by nodes XXX 19 and YYY 20. Data traffic selected by the path selector 16 as being SMPF traffic passes via the Sm-PGW 18 at which charging, policy control, legal interception and so on can be applied using the standardized interfaces (Gx,Gy,Gz).

Where the Path Selector 16 determines that data traffic is not destined for a node that requires SMPF information, it is routed as normal to a regular PGW 21 for further packet processing and routing.

The Path Selector 16 provides functionality for message routing, address mapping and Protocol Data Unit (PDU) transport mapping.

Considering first message routing, the Path Selector 16 provides routing and delivery of upstream (from the radio network 1) SMPF data traffic to relevant SMPF entities in the service network 3. It also provides delivery of downstream (to the radio network 1) SMPF traffic from the mobile core network 2 and the service network 3 to a radio network entity for which SMPF signalling is taking place (e.g. user related signalling intended for the RNC 5 currently serving the user).

Figure 4:
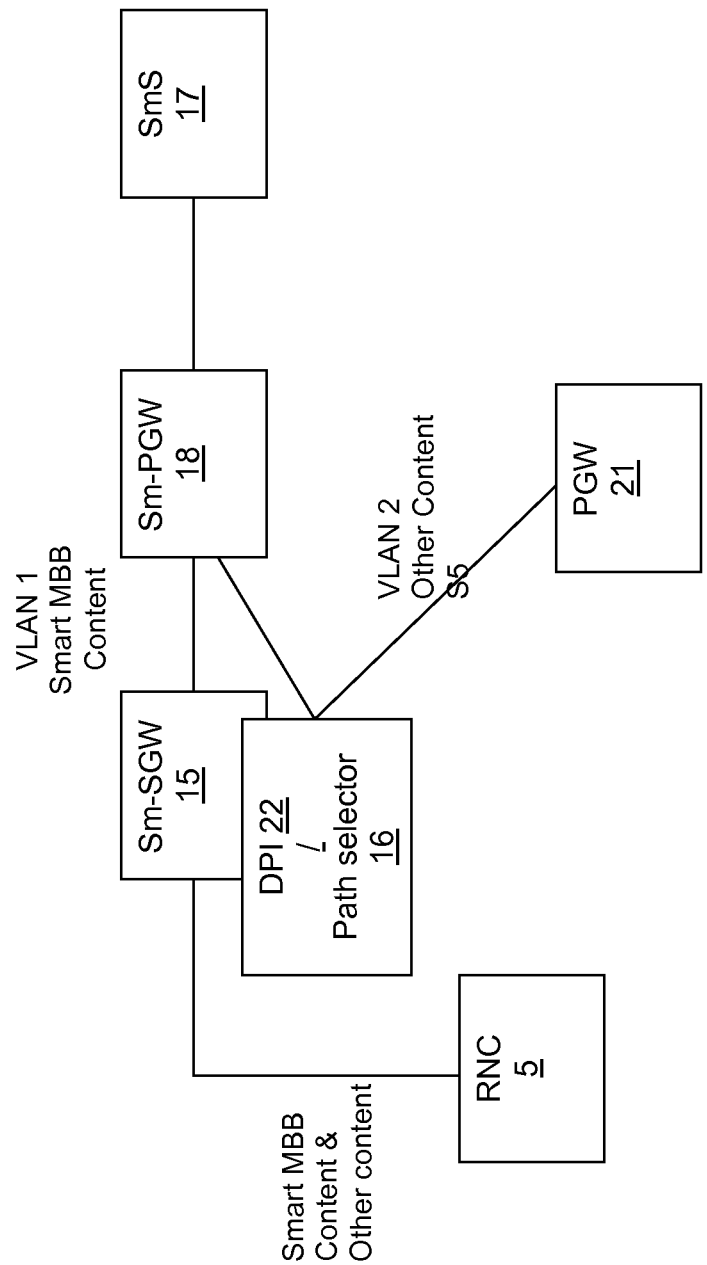
FIG. 4 illustrates schematically in a block diagram message routing in a communications network according to an embodiment of the invention.

Turning to FIG. 4, the Path Selector 16 performs message routing and allows the Sm-PGW 18 to co-exist with a Core Network resident PGW 21, i.e. to be an add-on to existing functionality for Network Aware Applications on the SMPF route. For Network Aware Applications and their services, the SMPF route and the Sm-PGW 18 is chosen as the next hop in the route. The PGW 21 is chosen as the next hop for all other applications and the services offered by these. The Sm-PGW 18 is used for Charging, Lawful Intercept (LI), and Policy handling for services and signalling on the SMPF route.

The Sm-SGW 15 is provided with a Deep Packet Inspection (DPI) function to determine whether a requested service should be served by a Network Aware node on the Network Aware path. A specific DSCP value for "Smart MBB" can be set to help a router to execute the policy based routing, and choose VLAN 1 for the Network Aware path. This assists the routing after the Sm-SGW 15 in the service network 3.

Figure 5:
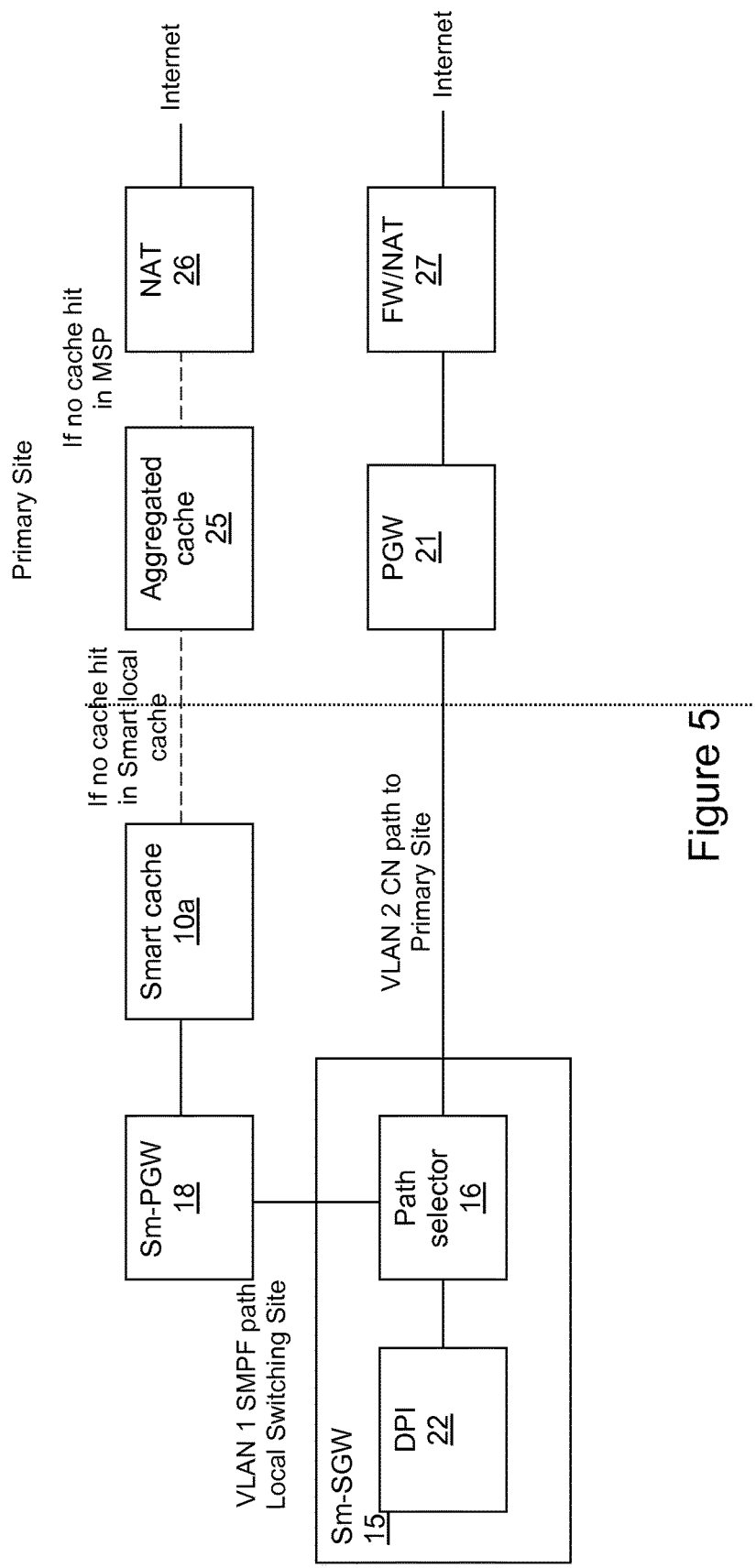
FIG. 5 illustrates schematically in a block diagram message routing using a VLAN according to an embodiment of the invention.

Turning to FIG. 5 herein, an SMPF route can be selected using a separate VLAN. If the DPI function 22 and the Path selector 16 determine that signalling should be routed to a Network Aware node, the signalling is sent to the Sm-PGW 18 and, if necessary, to a local cache 10a. From there, the signalling is sent to an aggregated cache 25 in the primary site and on to a NAT (Network Address Translation) function 26 before being forwarded towards, for example, a Network Aware Internet node. If signalling is not intended for a Network Aware node, it is sent to a PGW 21 and on to a NAT 27 as normal before being forwarded to the relevant nodes.

As mentioned above, the Path Selector 16 provides address mapping functionality. Address mapping is required for both upstream and downstream SMPF data traffic. Address Mapping for SMPF PDUs between the radio network 1 and the service network 3 depends on the transport protocol chosen for SMPF. Address mapping is therefore performed by the Path Selector 16 in the mobile core network 2. Some aspects of the structure of the SMPF PDU and transport options are described below.

The Path Selector 16 provides SMPF PDU transport mapping between the radio network 1 (S1-UP (LTE), S12 (UMTS/3G) and S4 (GSM)) and Gi connected SMPF entities.

SMPF PDUs can be signalled as GTP-U extension headers over an established GTP-U connection either:
together with User Plane traffic;
as an empty GTP-U message such that it has no payload, and the SMPF PDU is included in an extension headers;
as an echo-test message with extension headers; or
using a dedicated SMPF protocol.

One benefit with the first alternative (together with User Plane traffic) is that an SMPF PDU can be correlated with the actual user plane packet since the SMPF PDU and user plane packet come together to the receiving node.

Figure 6:
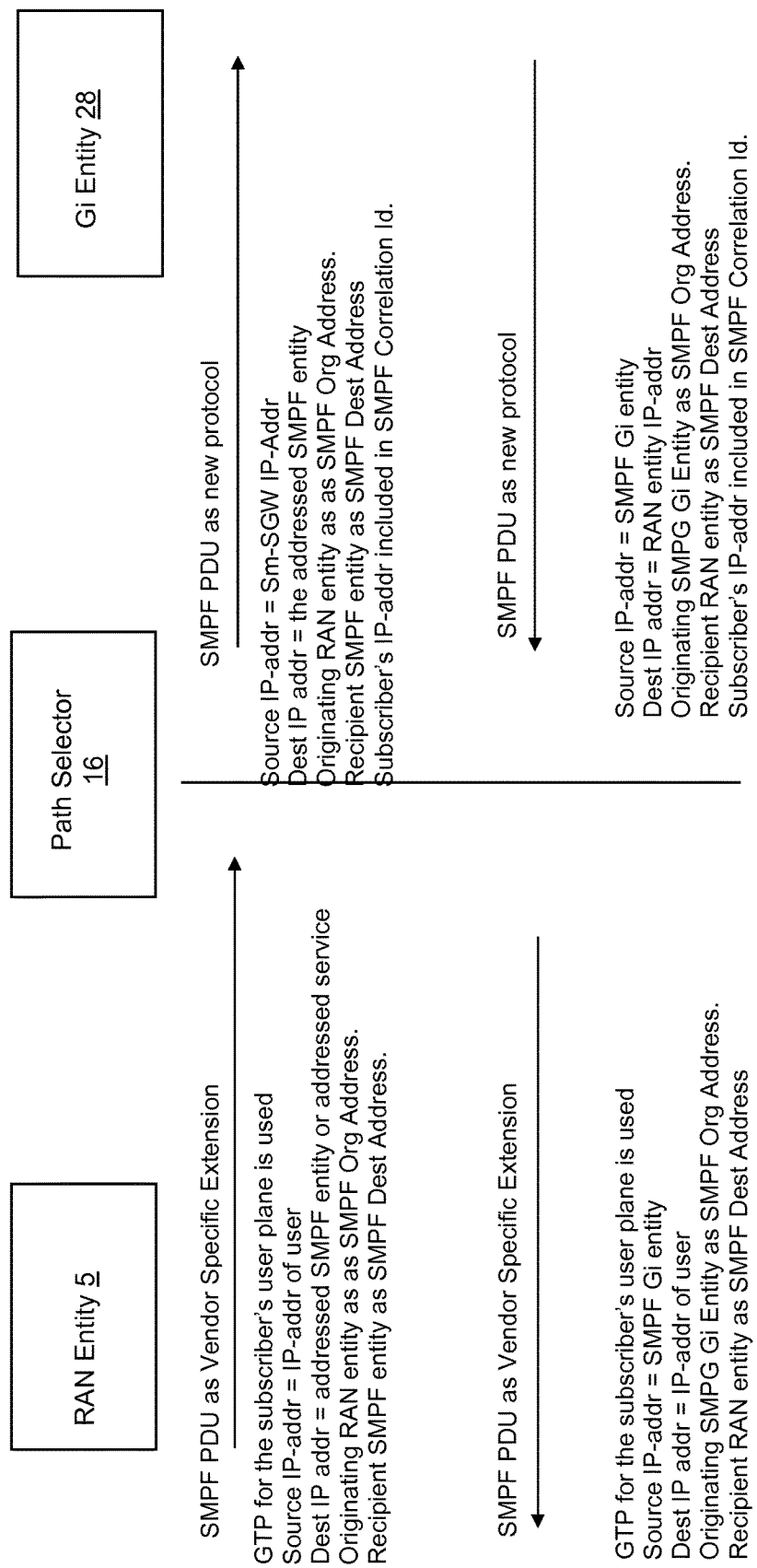
FIG. 6 illustrates PDU transport mapping between a radio network and a Gi entity in the service network using header extensions.

FIG. 6 illustrates address mapping at the path selector 16 between a radio network 1 entity and a Gi Entity 28 in the service network 3. This allows vendor-specific SMPF PDUs to be used on the radio network 1 side, and a dedicated SMPF protocol SMPF PDU to be used on the service network 3 side. This allows proprietary SMPF PDUs to be used on the radio network 1 side, because an SMPF PDU can be taken as a container from the signalling coming from the radio network 1, and the whole container can be forwarded to the service network 3 nodes in a new protocol. This greatly simplifies mapping.

Figure 7:
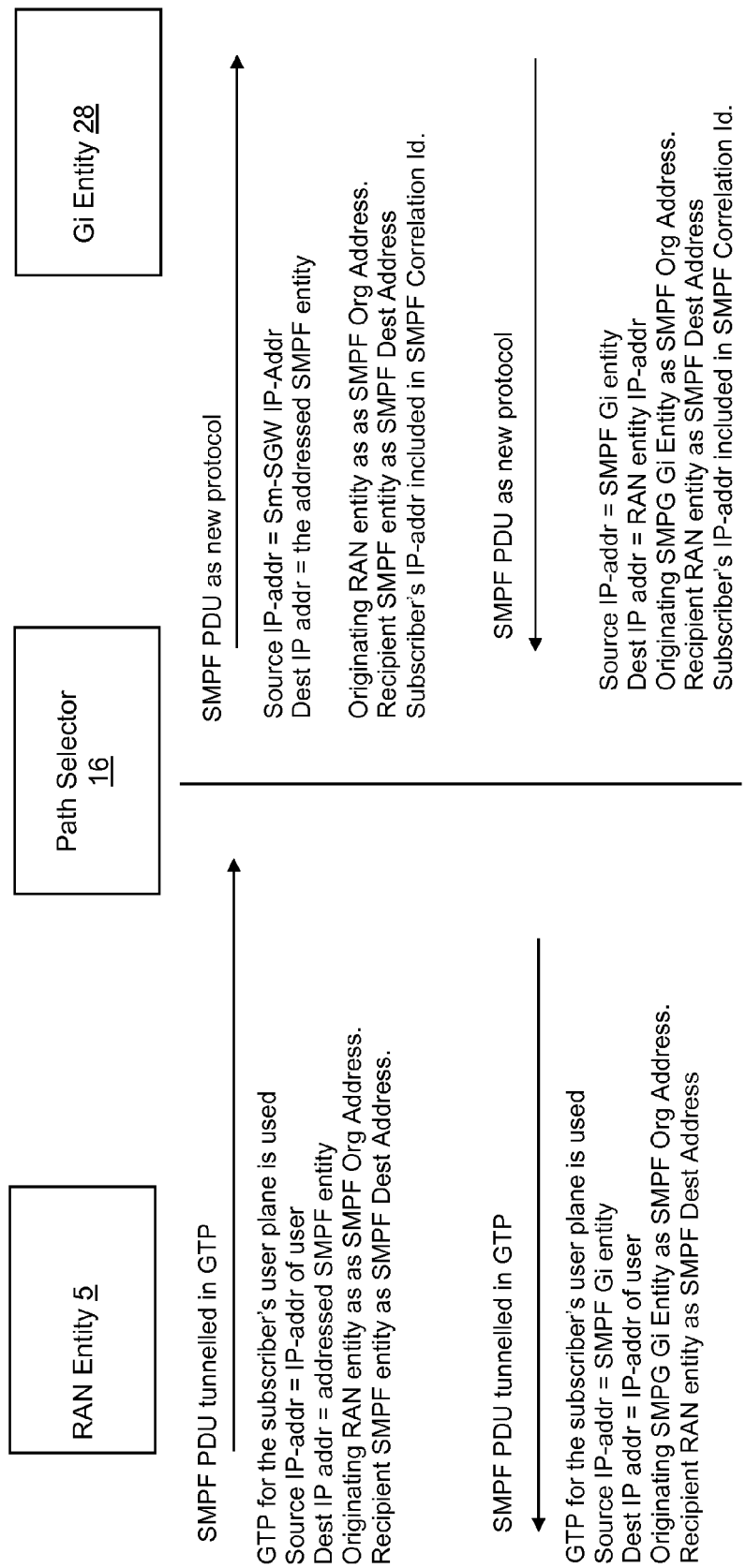
FIG. 7 illustrates PDU transport mapping between a radio network and a Gi entity in the service network using user plane data.

As an alternative to signalling SMPF PDUs as a GTP-U header extension, they may be signalled as user plane data. In either case, mapping is still required at the path selector 16 to a new protocol to be used on the service network 3. In this case, and referring to FIG. 7, the SMPF PDUs are signalled as User Plane data in GTP-U as a dedicated SMPF PDU GTP-U message. In this case, the PDU is tunnelled at the radio network 1 side in a GTP tunnel.

Figure 8:
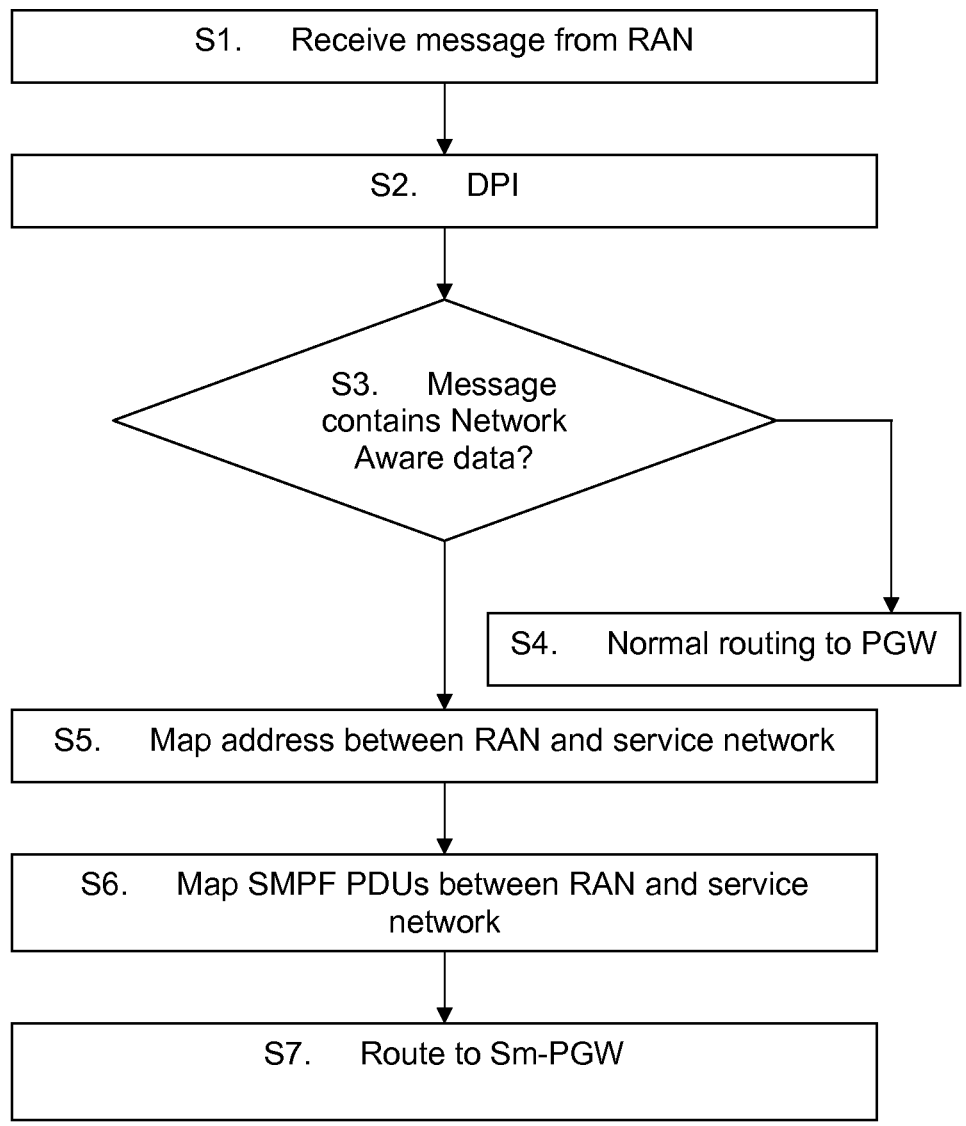
FIG. 8 is a flow diagram showing steps according to an embodiment of the invention.

FIG. 8 is a flowing diagram showing steps of an embodiment of the invention. The following numbering corresponds to the numbering of FIG. 8.

S1. The Sm-SGW 15 receives a message from the radio network 1.

S2. DPI is performed by a DPI function 22 or normal packet analysis (for example, if a GTP-U extension is used) to determine whether the message contains Network Aware data.

S3. The path selector function 16 determines whether the message should be routed to Network Aware nodes or to regular nodes. If the path selector function 16 determines that the message should be routed to Network Aware nodes, then the procedure continues at step S5, whereas if the path selector function 16 determines that the message should not be routed to Network Aware nodes, then the procedure continues at step S4.

S4. The path selector function 16 sends the message to a PGW 21.

S5. If necessary, address mapping between the radio network 1 and the service network 3 is performed, along with changing of the transport layer. For example, if the Network Aware data has been sent in a header extension, the data will need mapping to another transport mechanism.

S6. SMPF PDUs are mapped between the radio network 1 and the service network 3.

S7. The message is sent from the Sm-SGW 15 to the Sm-PGW 18.

Figure 9:
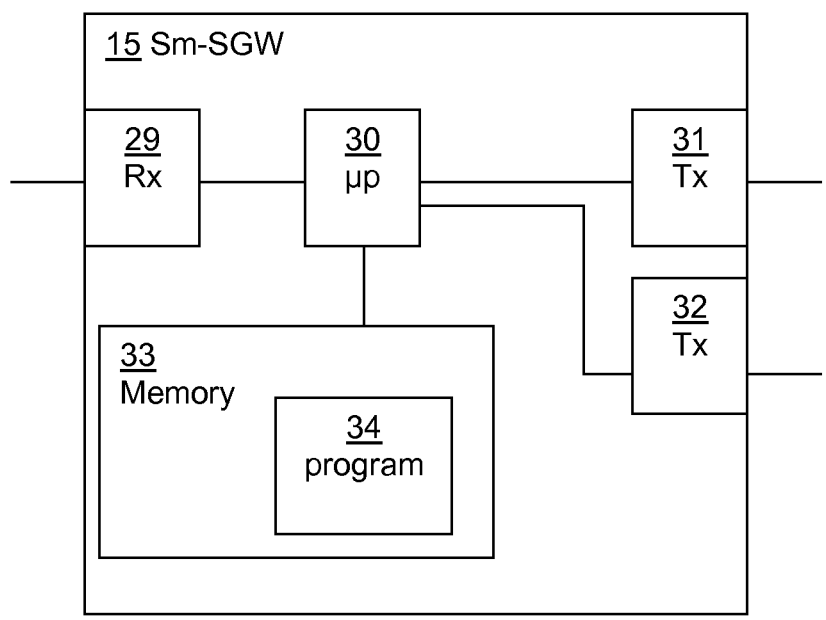
FIG. 9 illustrates schematically in a block diagram a gateway node according to an embodiment of the invention.

Turning now to FIG. 9, there is shown an exemplary Sm-SGW 15. A receiver 29 is provided for receiving a message from a radio network 1. A processor 30 is provided for operating the path selector function 16 which determines whether the message comprises Network Aware data (by DPI or some other method). A first transmitter 31 sends the message on to the Sm-PGW 18 in the event that it includes Network Aware data, and a second transmitter 32 sends the message on to a PGW 21 in the event that the message does not include Network Aware data. Of course, the two transmitters may be embodied in a single physical transmitter. A computer readable medium in the form of a memory 33 is also provided which is used to store a computer program 34.

The program 34, when executed by the processor 30, causes the Sm-SGW 15 to behave as described above.

The Path Selector 16 functionality in the Sm-SGW 15 distributes information currently not available to Network Aware applications and hosts functionality for message routing of upstream and downstream messages, address mapping and SMPF transport mapping.

A further issue with providing Network Aware data is informing all nodes in the radio network 1 and the service network 3 that Network Aware data is available and usable. This is achieved by using an SMPF bootstrapping procedure to allow SMPF entities discover one another, and to establish an association with a Policy Charging and Rules Function (PCRF) 40 for Policy handling for signalling sent along the SMPF route.

Figure 10:
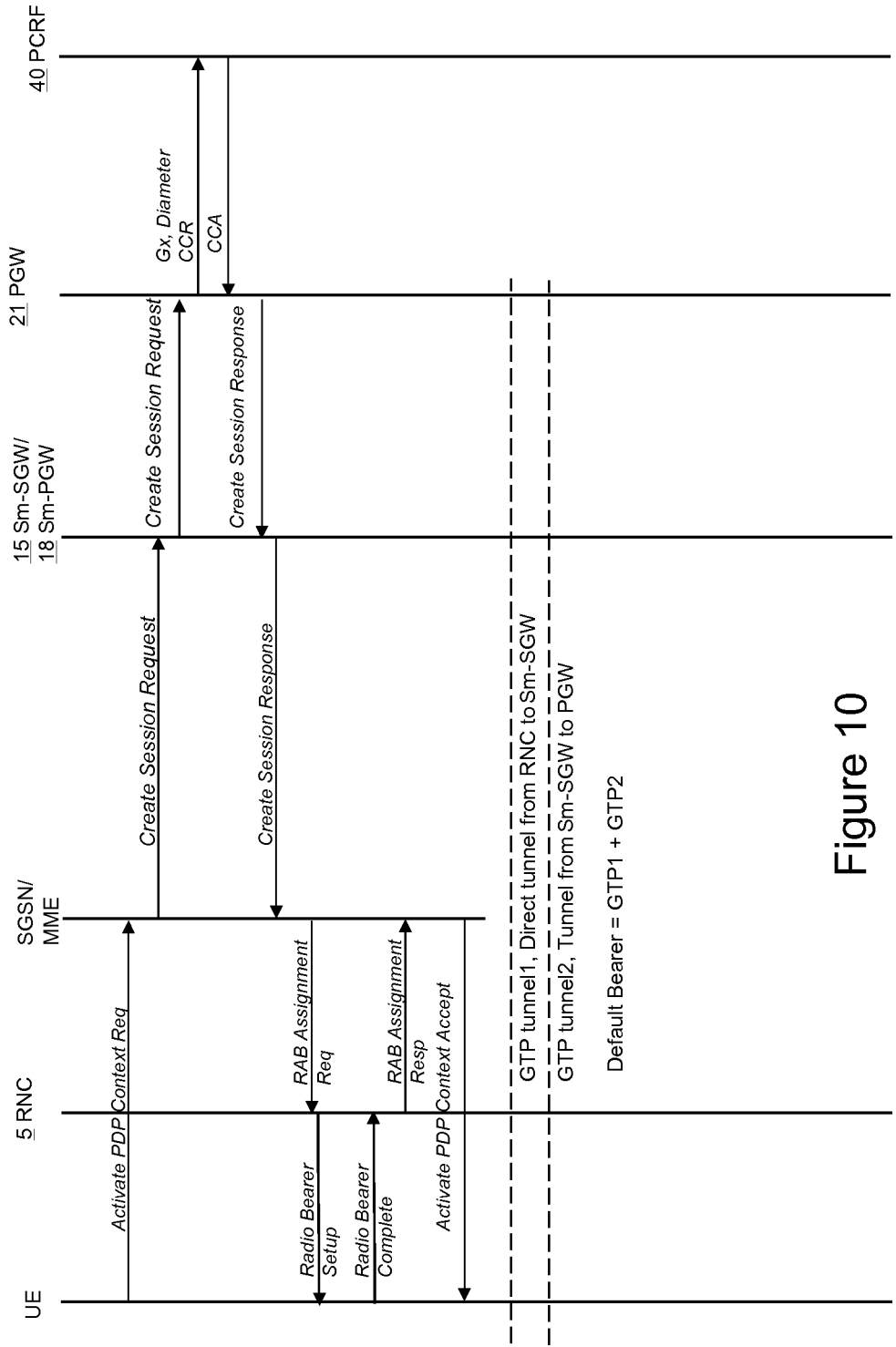
FIG. 10 is a signalling diagram illustrating an exemplary default bearer establishment procedure.

FIG. 10 illustrates the establishment of a Default Bearer. A PGW 21 is used for non-SMPF data traffic, and an SM-PGW 18 is used or SMPF data traffic.

Figure 11:
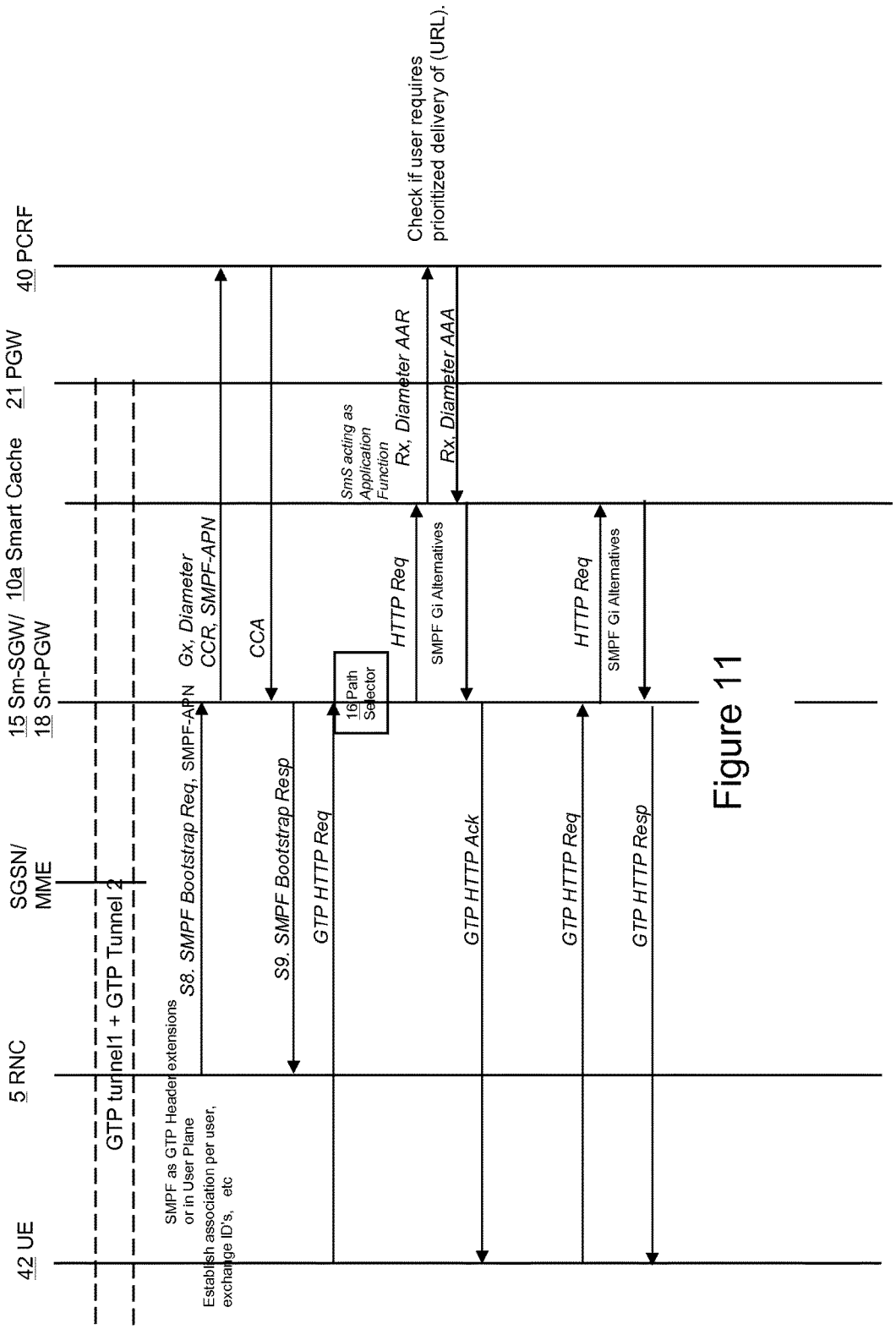
FIG. 11 is a signalling diagram illustrating bootstrapping signalling according to an embodiment of the invention.

FIG. 11 shows an exemplary bootstrapping procedure. The path selector function 16 at the Sm-SGW 15 is illustrated as part of the signalling to better show the point at which the path selector function 16 is used. The Sm-SGW 15 contains functionality for performing the SMPF Bootstrap signalling shown in FIG. 11. It receives SMPF Bootstrap requests from the RNC 5 and delivers these to Network Aware Applications such as the Smart Cache 10a on the SMPF-Route.

The purpose of the SMPF bootstrap procedure is to let the SMPF entities (nodes) in a radio network discover a Sm-SGW 15 that support SMPF signalling. The bootstrap uses a special Access Point Name (APN), namely the SMPF-APN. This APN is internal to the network. The RNC 5 in the example announces S8 SMPF capabilities to the Sm-SGW 15, which replies S9 with an acknowledgement and additional SMPF information. For example, IMSI/MSISDN would be relevant to an eNB (but not the RNC 5 used in this example). This allows the RNC 5 or other radio network entity to determine that the Sm-SGW is capable of handling SMPF traffic.

A further purpose of the SMPF bootstrap procedure is to initiate the signalling for Policy handling over the Gx interface (CCR signalling) from the Sm-SGW 15/Sm-PGW 18 to the PCRF 40 for the SMPF APN. The SMPF APN is used for all services provided by SMPF nodes, but the signalling to the PCRF is originated by the SMPF bootstrap function in Sm-SGW 15 when it receives the SMPF Bootstrap Req S8, and does not involve the terminal (UE) 42.

The Path Selector DPI procedure described above will determine if a user generated message (e.g. HTTP) should be sent along the SMPF path (via the Sm-PGW 18) or the "CN GW path" (via the PGW 21).

The SMPF bootstrap functionality in the Sm-SGW 18 initializes the SMPF signalling by letting SMPF entities discover each other, and by establishing an association with the PCRF 40 for Policy handling when messages are sent along the SMPF route.

Note that the bootstrapping techniques described above can be performed in isolation of the other SMPF techniques described above.

Another issue is that, in existing networks, some data is not available to all functional entities that wish to use it to optimize service behaviour. Moreover, the optimal delivery mode is dependent on the signalling procedure. Some procedures are point-to-point whereas others are of a one-to-many or many-to-many nature. In other words, the information sent by the originator may be of interest to more than one recipient. The term M2M (Many-to-Many) has been used below, and a solution for delivering SMPF information in an M2M fashion is described.

Figure 12:
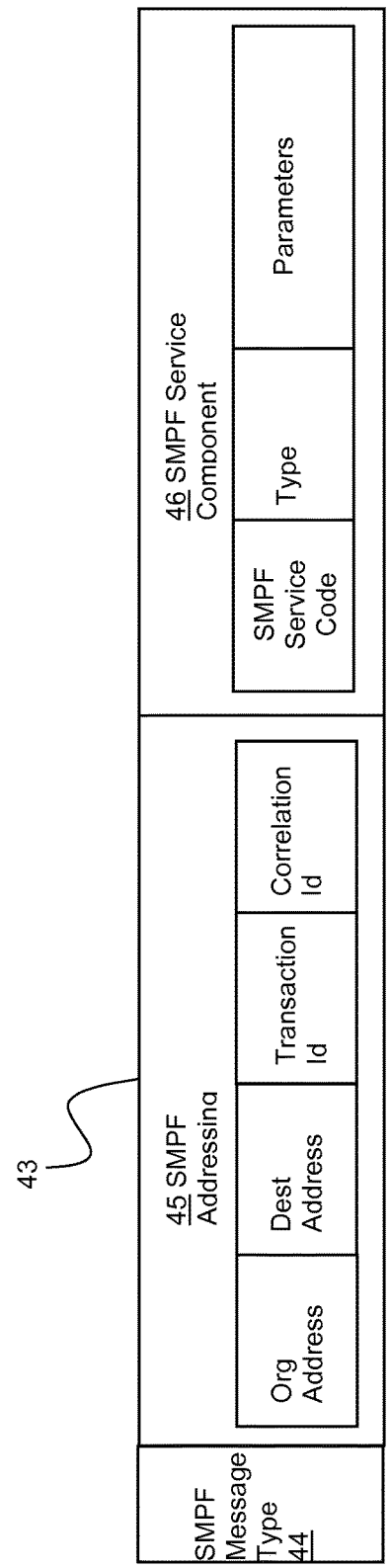
FIG. 12 illustrates schematically in a block diagram an exemplary Protocol Data Unit.

Turning to FIG. 12, an SMPF PDU 43 is illustrated. The SMPF PDU 43 is transport independent, and contains a Message Type element 44, and SMPF addressing element 45 and an SMPF Service Component element 46.

The Message Type element may include any of the following:
Start/Bootstrap
Transfer P2P (Point-to-Point)
Transfer M2M (Many-to-Many)
Stop In this example, the "Transfer M2M" Message Type is used for M2M signalling, i.e. when the information sent by the originator may be consumed by many recipients. Examples of such information include a User Activity Report containing DPI retrieved (URL, requested service, etc.) information and Control Plane retrieved information (location, RAT, terminal type, etc).

Figure 13:
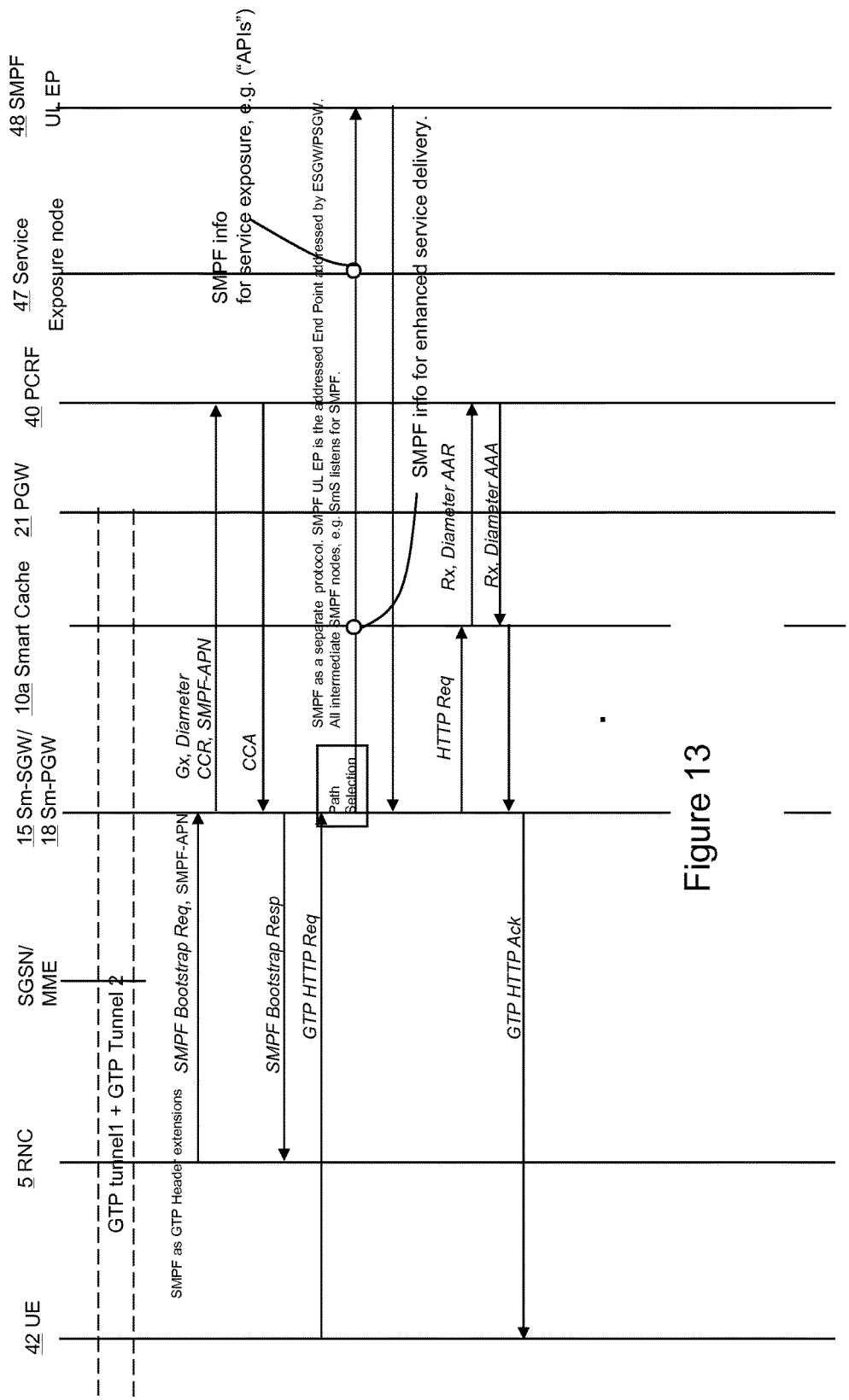
FIG. 13 is a signalling diagram showing exemplary signalling for sending SMPF signalling to a plurality of destinations.

FIG. 13 shows exemplary signalling where there are two entities who need to receive an SMPF User Activity Report; the Smart Cache 10*a* and a Service Exposure node 47 The Smart Cache 10*a* uses the User Activity report o check whether it is available in the cache (requested service) and to tailor the presentation (location, terminal type).

The Service Exposure node 47 logs the User Activity Report and publishes it to applications requesting this information, e.g. a user's current location.

Upstream SMPF M2M messages are addressed to a fictitious end-point, termed the SMPF UL-EP 48. This prevents the information in the User Activity Report from spreading to non-SMPF entities. The address of the SMPF UL-EP 48 is the ultimate destination of SMPF messages having passed all other relevant SMPF nodes on the SMPF route. However, this is just a "dummy" endpoint address to prevent the SMPF M2M messages from being forwarded to other nodes.

Downstream SMPF M2M messages are addressed to an SMPF DL-EP received in the first upstream message.

Figure 14:
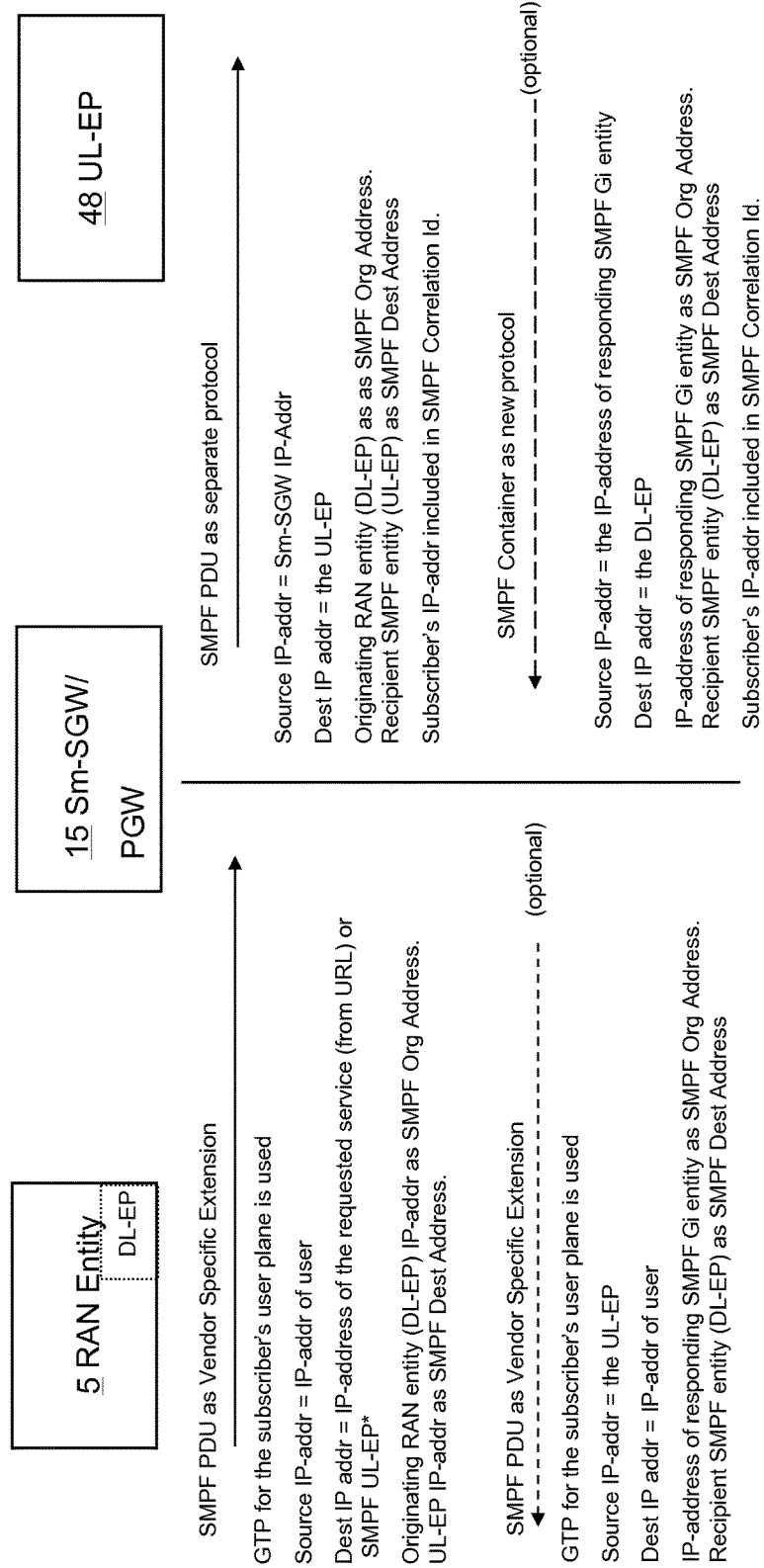
FIG. 14 illustrates addressing and PDU transport mapping where many receiving nodes require Network Aware data.

Addressing of SMPF M2M messages is illustrated in FIG. 14.

Providing a solution for many to many signalling allows delivery of information to many Network Aware applications interested in the same Network Aware data. The information is sent once from the originator to interested parties on the SMPF route, instead of several point-to-point deliveries from the originator to each recipient. This lowers the amount of signalling and enables timely delivery of the information.

The skilled person will appreciate that various modifications may be made to the above described embodiments without departing from the scope of the present invention. For example, the description above refers to GSM/3G/LTE radio networks, but it will be appreciated that the same principles may be applied to other types of radio network technology, such as GSM/EDGE. Similarly, the description above refers to an SGW and a PGW, which is LTE/EPC technology. However, it will be appreciated that corresponding functions have different names with different types of network technology. For example, the SGW and PGW functions are performed by a GGSN for WCDMA or other types of network.

The following abbreviations have been used in this specification:
AP Access Point
DPI Deep Packet Inspection
FBC Flow Based Charging
EDGE Enhanced Data rates for GSM and TDMA Evolution
EPC Evolved Packet Core
GGSN Gateway GPRS Support Node
GPRS General Packet Radio Service
GSM Global System for Mobile communications
GTP-U GPRS Tunnelling Protocol User Plane
LTE Long Term Evolution
M2M Many to many
MBB Mobile broadband
NAT Network Address Translation
PCC Policy and Charging Control
PCRF Policy Charging and Rules Function
PDN Packet Data Network
PDU Protocol Data Unit
PGW PDN Gateway
QoS Quality of Service
RAN Radio Access Network
RNC Radio Network Controller
SGW Serving Gateway
SMPF Smart Mobile Broadband Protocol Framework
Sm-PGW Smart PDN Gateway
SmS Smart Server
Sm-SGW Smart SGW
PDU Protocol Data Unit
PI Packet Inspection
UE User Equipment
VLAN Virtual Area Network
WCDMA Wideband Code Division Multiple Access

The invention claimed is:

1. A method of handling data between a radio network and a service network, the data comprising Network Aware data, the method comprising:
    at a gateway node in a mobile core network, receiving from the radio network a message;
    determining whether the message comprises Network Aware data, wherein Network Aware data comprises information about network conditions or requirements of the radio network; and
    in the event that the message comprises Network Aware data, routing the message to a Packet Data Network Gateway node configured to handle Network Aware data, and in the event that the message does not comprise Network Aware data, routing the message to a Packet Data Network Gateway node for message handling.

2. The method according to claim 1, further comprising, at the gateway node, performing deep packet inspection on packets traversing the gateway node to determine whether the message comprises Network Aware data.

3. The method according to claim 1, further comprising, at the gateway node, mapping an address used in the radio network to an address usable by the service network.

4. The method according to claim 1, further comprising, at the gateway node, mapping a Protocol Data Unit used in the radio network to a Protocol Data Unit usable by the service network.

5. The method according to claim 4, wherein the Protocol Data Unit used in the radio network is received as an extension header over an established General Packet Radio Service Tunnelling Protocol User Plane connection.

6. The method according to claim 5, wherein the Protocol Data Unit used in the radio network is received at the gateway node as any of a message comprising no payload, a message comprising a payload, and an echo test message.

7. The method according to claim 4, wherein the Protocol Data Unit used in the radio network is received at the gateway node as user plane data in a General Packet Radio Service Tunnelling Protocol User Plane message.

8. The method according to claim 4, wherein the Protocol Data Unit used in the radio network is received at the gateway node using a dedicated signalling protocol.

9. The method according to claim 1, wherein a Protocol Data Unit used in the radio network has a message type indicating that the message is destined for a plurality of nodes.

10. The method according to claim 9, wherein the message is addressed to a fictitious end point in the service network.

11. A gateway node for use in a mobile core network for handling data between a radio network and a service network, the gateway node comprising:
  a receiver for receiving a message from the radio network;
  a processor for determining whether the message comprises Network Aware data wherein Network Aware data comprises information about network conditions or requirements of the radio network;
  a first transmitter for, in the event that the message comprises Network Aware data, sending the message to a Packet Data Network Gateway node configured to handle Network Aware data; and
  a second transmitter for, in the event that the message does not comprise Network Aware data, routing the message to a Packet Data Network Gateway node for message handling.

12. The gateway node according to claim 11, wherein the processor is arranged to perform deep packet inspection on packets traversing the gateway node to determine whether the message comprises Network Aware data.

13. The gateway node according to claim 11, wherein the processor is further arranged to map an address for the message used in the radio network to an address usable by the service network.

14. The gateway node according to claim 11, wherein the processor is arranged to map a Protocol Data Unit used in the radio network to a Protocol Data Unit usable by the service network.

15. The gateway node according to claim 11, wherein the processor is arranged to address the message to a fictitious end point in the service network.

16. A computer program product comprising a non-transitory computer readable medium and a computer program stored on the non-transitory computer readable medium, the computer program comprising computer readable code which, when run from the non-transitory computer readable medium in a processor in a gateway node, causes the gateway node to perform a method as claimed in claim 1.

* * * * *